United States Patent [19]

Morand et al.

[11] Patent Number: 5,894,286
[45] Date of Patent: Apr. 13, 1999

[54] INTERFEROMETRIC RECEIVER FOR ELECTROMAGNETIC SIGNALS

[75] Inventors: Jean-François Morand, Paris; Jacques Franquet, La Celle Saint Cloud; Claude Mandon, Saint Cloud; Jean-Philippe Arduin, Meudon; Philippe Karakachian, Paris; Pierre-Yves Chaltiel, Mareil sur Mauldre, all of France

[73] Assignee: Dassault Electronique, Saint-Cloud, France

[21] Appl. No.: 07/057,266

[22] Filed: Apr. 22, 1987

[30] Foreign Application Priority Data

Apr. 23, 1986 [FR] France ................ 86 05884
Sep. 23, 1986 [FR] France ................ 86 13284
Nov. 19, 1986 [FR] France ................ 86 16115

[51] Int. Cl.$^6$ ..................................... G01S 5/04
[52] U.S. Cl. ............................. 342/442; 455/275
[58] Field of Search ................... 342/424, 442, 342/446, 417, 382; 455/131, 275, 314, 273, 203, 204

[56] References Cited

U.S. PATENT DOCUMENTS 4,160,252  7/1979  Lucas et al. ...................... 342/424

*Primary Examiner*—Theodore M. Blum
*Attorney, Agent, or Firm*—Anderson, Kill & Olick, P.C.

[57] ABSTRACT

An interferometric receiver for electromagnetic signals comprises at least two reception channels. Each channel consists of an antenna (A1), followed by a single sideband mixer (M12) and a mixer (M14).

As a local signal, the mixer (M14) receives a signal similar to the received signals, taken, for example, from an auxiliary antenna (AR) followed by a limiting amplifier (ALR). The first mixer (M12) receives a frequency from a generator (GFI), which frequency is equal to the value of the intermediate frequency used in the stages (FI1) of this type following the mixer (M14). A phase processing can then be carried out and different countermeasures taken, the simplest of which is a visualization (VI).

23 Claims, 5 Drawing Sheets

INTERFEROMETRIC RECEIVER FOR ELECTROMAGNETIC SIGNALS

The invention concerns an interferometric receiver for electromagnetic signals which can serve for the passive measurement of the direction of arrival of electromagnetic signals as well as for the localization of transmitting sources such as radar.

It is applied chiefly, but not exclusively, to countermeasure radar systems.

The current trend in the area of radar is to modify the radioelectric characteristics of their radiation in a pseudo-random manner. Thus, it is known to modify the pulse width, transmitter frequency, the polarization of the transmitted and received wave, and the repetition frequency at which the radar operates, for the most part.

The only variable difficult to modify rapidly is the physical position of the radar. When situated next to an electronic countermeasure receiver the direction of arrival of the radar signals is a relatively stable magnitude, that is, one which is valuable for deciding and reacting. As a consequence, these electronic countermeasure receivers must accomplish a precise measurement of the direction of arrival of the incident signals.

Moreover, it is desirable that this measurement of direction possess other different characteristics:

- monopulse operating mode so as to permit a sorting of received pulses in a dense electromagnetic environment;
- sufficient sensitivity to permit the processing of radars of the HFR (high frequency repetition) and CW (continuous wave) types;
- maximum probability of interception of signals whose frequency is comprised in the reception band, which means that the receiver which is used must be of the "instantaneous wide band" type, in contrast to receivers which scan a wide band by means of temporal multiplexing; and
- sufficient precision for the localization of hostile elements and for plotting the transmitting countermeasure antenna, particularly if the latter sweeps electronically.

Certain currently known systems use direct detection receivers, that is, those which effect a quadratic detection of the amplitude of the received signal. Thus, they are associated with amplitude goniometry devices, which typically consist in four wide-band spiral antennae arranged in a square and covering a total sector of 360°. Based on a comparison of the amplitudes detected at the output of different antennae, the angle of arrival of the received signal can be calculated. This solution provides a large interception probability, but does not offer a sufficient precision or sensitivity, at least when taking into consideration the fact that the number of spiral antennae is limited for reasons of space, which is particularly constraining when this involves an airborne system.

Other known systems use receivers of the superheterodyne type which operate by means of progressively scanning the operating band by means of a variable local oscillator signal. These superheterodyne receivers can also operate with an amplitude goniometry system. Thus, they suffer from the same lack of precision as the direct detection receivers. But the superheterodyne receivers can likewise work with a coherent phase goniometry system, that is, an interferometer. These devices permit the calculation of the direction of arrival of signals based on the measurement of the differential phase of signals originating from wide-band antennae which are appropriately spaced. The sensitivity and precision of measurement are favorable. On the other hand, the time required for scanning the operating band greatly reduces the interception probability.

The present invention has the object of remedying these disadvantages by using a receiver which can be considered as being of the homodyne type. It will also be seen that the phase information is maintained without the necessity of a frequency sweeping of the local oscillator.

Functionally, the signals are translated from a fixed frequency (equal to the value of the desired intermediate frequency) in such a way that, after mixing with the local oscillator signal, which has the form of the signal which is received, amplified, limited, and possibly frequency-filtered, the signals are at the desired intermediate frequency. The invention is applied particularly to the case in which the reception means comprise a plurality of separate channels assigned to antennae defining one or more interferometric bases.

In the following, for the sake of simplicity, the example of two antennae defining a single interferometric base will be considered.

The person skilled in the art knows that, in practice, at least three antennae are used in such a way as to have the same quantity of interferometric bases.

In order to solve the aforementioned problem, the invention proposes a receiver of electromagnetic signals of the type comprising:

- at least two radiofrequency reception channels, each one comprising an antenna;
- means for separately mixing the output signals of the two radiofrequency reception channels with one or more local signals;
- two intermediate-frequency amplification channels connected to respective outputs of the mixing means; and
- means for processing the signals derived from the two intermediate-frequency amplification channels.

Aside from this known construction, the invention is remarkable in that each channel of the mixing means comprises:

- a first mixer of the single sideband type, receiving a local signal with a fixed frequency equal to the value of the intermediate frequency; and
- a second mixer which receives, as a local signal, a received reference signal similar to that of the two reception channels.

As will be seen in the following, it is advantageous to interpose ultrahigh-frequency insulators between each antenna and the first mixer, and particularly between the first and second mixers.

The received reference signal can be taken from one of the normal reception channels. However, it is considered preferable to take it from an auxiliary reception channel comprising limiting amplification means in succession to its own antenna, which is advantageously more directional than those of the principal reception channels.

According to another feature of the invention, the reference reception channel contains means for frequency filtering which permit a selection of the signals as a function of their spectral characteristics, chiefly in order to avoid interference by friendly signals.

According to another feature of the proposed device, each intermediate-frequency amplification channel comprises two bandpass filters enclosing an intermediate-frequency amplifier suitable for supplying a level indication; the outputs of the two channels are connected to a phase comparator operating by means of coherent demodulation.

The sine and cosine data derived from the coherent demodulation and the level indications are digitized by means of an analog-to-digital converter. Insofar as the digital phase data are also in sine and cosine, it is appropriate to use read-only storages in order to extract the true phase data.

According to another feature of the invention, the processing means also comprise a first in-first out storage assigned to a tracking generator and a processing unit.

A first interesting variant of the invention permits a measurement of instantaneous frequency in that it uses as far as possible the same means as for the acquisition of the direction of an incident radioelectric signal.

Aside from the economy which can result from this, it also permits the direct connection of a measurement of direction and a measurement of frequency without the risk of error and with the guarantee that the latter correspond to the same incident signal.

According to this first variant, at least one of the two mixing channels comprises a delaying device in parallel with the second mixer, followed by a third mixer which also receives the aforementioned received reference signal as local signal. The phase comparison between the outputs of the second and third mixers provides data on the frequency of the incident signal.

The person skilled in the art knows that a measurement of frequency which is effected through a measurement of phase can be:

- a measurement which is unambiguous, but is generally crude, that is, its precision is not great,
- an ambiguous measurement whose precision is great but which does not, in itself, permit the determination of the most important figures if other data are not available.

Thus, it is preferred, according to this first variant, that at least one other mixing channel also comprises another delaying device, in parallel with its second mixer, followed by another third mixer, the respective delays of the two delaying devices being different. As a result of this difference, the characteristics of ambiguity of the two data obtained on the frequency are different.

Thus, a first method consists in choosing one of the delays so that it will provide an unambiguous measurement of frequency, at least at the useful frequency band of the incident signals, while the other permits a more exact measurement of frequency. The comparison of the two measurements thus provides sufficient knowledge of the frequency of the incident signal.

According to another method, the different delays are selected in order to define a plurality of exact and ambiguous frequency measurements, but in different ways, wherein the comparison permits an elimination of the ambiguity in the manner of a Vernier effect, well known to one skilled in the art. In such a case, it is preferable to have available at least three different delays.

A second variant, compatible with the-first, permits an optimization of the sorting of the signals in question at the level of interferometry.

For this purpose, the means for generating the received reference signal are arranged so as to effect a spatial filtering suitable for modifying the weight of the received signals in certain spatial directions.

More particularly, the means for generating the reference signal comprise an antenna system, each of whose elements have the same angular coverage as the antennae of the two radiofrequency reception channels, and generalized gain controlling means for providing the received reference signal by means of combining the signals provided individually by the elements of the antenna system, which combination is weighted with respect to amplitude and phase.

Still more particularly, the generalized gain controlling means comprise transfer units with variation of amplitude, phase or time in series with each element of the antenna system, as well as means for controlling these units in order to obtain desired modifications relative to certain directions of the radiation pattern of the antenna system.

Other characteristics and advantages of the invention follow from an examination of the following detailed description and attached drawings.

Figure 1:
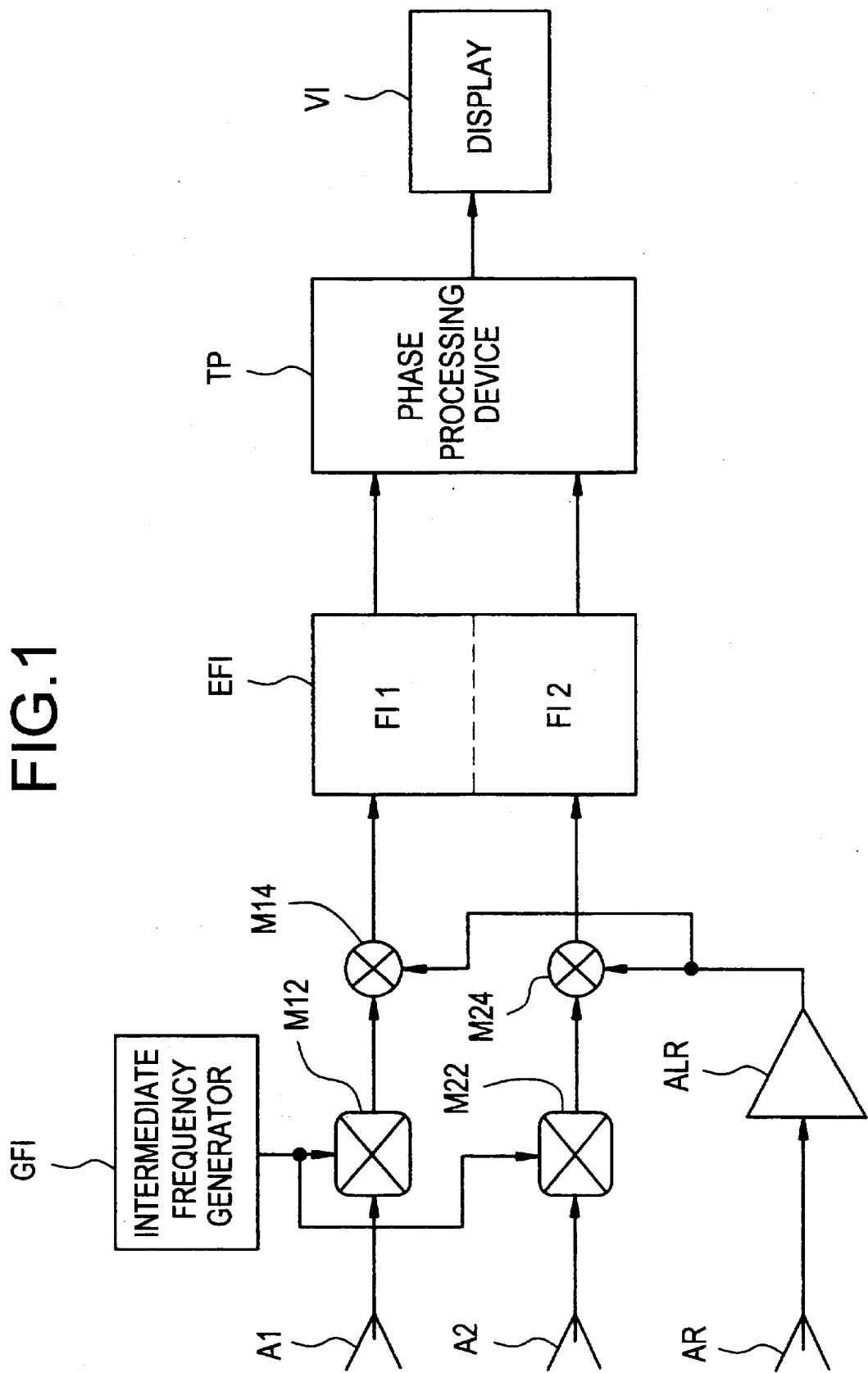
FIG. 1 shows a skeleton diagram of an interferometric receiver according to the invention.

In FIG. 1, a first principal reception channel is defined by a spiral antenna A1, a first mixer M12, a second mixer M14, and an intermediate-frequency channel FI1 constituting a part of the intermediate-frequency stages EFI. A second principal reception channel, which is identical to the first (as far as is possible in practice), consists of an antenna A2, the first mixer M22, the second mixer M24, and the second intermediate-frequency channel FI2.

The first mixers M12 and M22 receive an intermediate-frequency generator GFI and a first local signal, whose value is equal to that at which the intermediate-frequency stages EFI are adjusted. The second mixers M14 and M24 receive a second local signal which is, in fact, a received signal taken from an auxiliary reception antenna AR, followed particularly by a limiting amplifier ALR of the reference channel.

The outputs of the two intermediate-frequency channels FI1 and FI2 are connected to a phase processing device TP, generally followed by display devices VI.

One skilled in the art will understand that the limitations with respect to the operating band are brought about by the microwave components, particularly the amplifiers, mixers and antennae. It will likewise be recalled that, in practice, the interferometric receiver comprises a third principal reception channel, followed by a corresponding intermediate-frequency channel, none of which is shown here for the sake of simplicity.

These solutions with a plurality of antennae make it possible to provide a plurality of interferometric bases and, accordingly, on the one hand, to improve the precision of measurement and, on the other hand, to eliminate the ambiguities which exist when phase shifts occur in the operating band which exceed ±180°.

As already mentioned, the antenna AR of the reference channel can have a different coverage than those A1 and A2 of the measurement channels. For example, it can be more directional in order to ensure a sorting of threats by means of spatial filtering.

The reference channel, shown schematically in FIG. 1 by means of the single limiting amplifier ALR, can likewise comprise frequency filtering devices which are correspondingly regulated for eliminating unwanted friendly and/or hostile signals. Of course, the signals which are filtered in this way on the reference channel will not be taken into account for measuring the direction of arrival of the useful signals.

Figure 2:
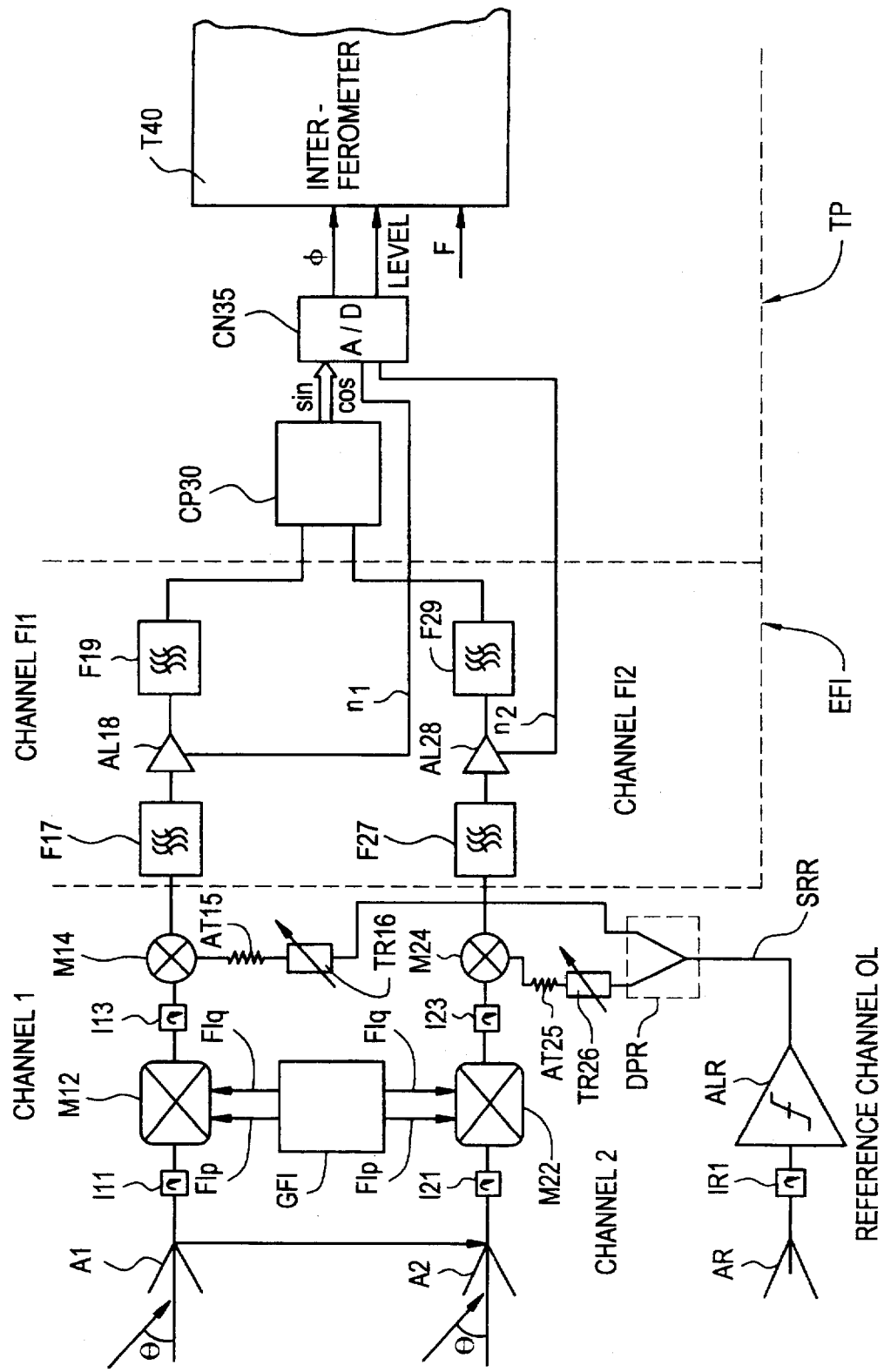
FIG. 2 is a more detailed diagram with respect to the analog part of the receiver according to the invention.

FIG. 2 shows that the antennae A1 and A2 jointly define an interferometric base of dimension d. It is assumed that the incident signals arrive according to a direction which forms an angle $\ominus$ with the axis of the antennae.

Only one channel will be described now, the elements of the other channel being identical in principle and having a reference number increased by 10.

The signal perceived by the antenna A1 is applied to an ultrahigh-frequency insulator I11 which precedes the single sideband mixer M12. The latter is followed by one or more insulators I13 and then by the second mixer M14. Following the auxiliary antenna AR, the reference channel comprises an insulator IR1, followed by the limiting amplifier ALR. Adjusted for achieving a gain of 85 to 90 decibels, the latter can comprise a plurality of stages separated by the same quantity of filters. The means for sensitive frequency filtering can likewise be provided between these stages for the purpose of eliminating unwanted signals.

The output of the amplifier ALR supplies the local reference signal SRR.

The latter is applied to a power divider DPR having two branches in this instance.

As indicated before, only the branch which is directed toward the first principal reception channel will be considered here. This comprises a phase adjustment device TR16, followed by an attenuator AT15 which finally supplies the local signal to the mixer 14.

The phase adjustment is achieved by the device TR16, for example, in the form of a line of variable length. This adjustment permits one to take into account the differential phase shifts which may exist between the different principal reception channels.

If the input frequency at the first mixer M12 is designated Fe and the frequency created by the generator GFI is designated FI, the output signal of the mixer M12 particularly comprises the frequencies Fe+FI and Fe–FI.

For example, let the frequency Fe–FI be the frequency selected for the phase processing. In this case, it is very desirable that the single sideband mixer M12 have an image frequency rejection such that it attenuates the image line Fe+FI with an attenuation factor of at least 18 decibels, preferably 20 decibels.

The value of the frequency Fs obtained at the output of the mixer M12 is thus shifted by FI in relation to Fe.

Each of the aforementioned insulators can be realized in the form of a circulator, two of whose ports are used, while the third port is connected to an adapted load of 50 ohms.

These insulators primarily ensure the matching (in the sense of ultrahigh frequencies) of the different microwave components.

More particularly, the insulators such as I11, I21, IR1 have the object of eliminating the disadvantageous effects resulting from the standing wave ratio which can be produced by each antenna with respect to the circuits arranged downstream. They also prevent the disadvantageous effects of coupling between the principal reception channel antennae and the reference channel antennae.

An insulator such as I13, which is arranged between the two mixers, is more critical. For this reason, it may be necessary to double it. Its function is actually to prevent the strong local signals proceeding from the reference channel from reascending through the mixer M14 to mix with the frequency FI in the mixer M12 and then to redescend toward the mixer M14 with the same characteristics as the received signals of this principal reception channel. Such leakage actually supplies erroneous indications at the linked intermediate frequency channel.

The role of the reference channel is to supply a signal SLR which is limited to a level which is predetermined and constant in the instantaneous dynamics and the frequency band under consideration. The attenuators AT15 and AT25 operate on a typical value of 3 decibels in such a way as to supply a level signal conforming to the second mixers M14 and M24.

Because of the adjustment permitted by the devices TR16 and TR26, the spectrum of the input signals is brought back to a narrow-band intermediate frequency FI at the output of the mixers M14 and M24, the differential phase between the channels being maintained. The values of the intermediate frequency itself and of the pass-band connected with it are imposed by two constraints. One must choose a value of FI such that the processing of the video frequency is as easy as possible, while simultaneously choosing a pass-band which allows the short pulses to be taken into account.

Each of the two intermediate-frequency channels comprises a bandpass filter such as F17, followed by a limiting amplifier such as AL18 and a new bandpass filter F19. The same applies to the second channel with reference numerals which are increased by 10.

The four filters F17, F19, F27, F29 have the same pass-band and are centered around the value FI of the intermediate frequency.

The role of the filters F17 and F27 is to filter the intermodulation products other than FI at the output of the mixers M14 and M24. The filters F19 and F29, in turn, have the object primarily of ensuring the rejection of the harmonic distortions generated by the limiting function (chiefly) of the amplifiers AL18 and AL28. A strong rejection out of the band (beyond twice the intermediate frequency) is desirable for all these filters. In this instance, strong rejection means an attenuation greater than or equal to 60 decibels.

The outputs of the two intermediate frequency channels drive a phase comparator CP30, which is assumed here to supply the sine and cosine data. In addition to their function consisting in providing a sufficient level for driving the phase comparators, the amplifiers AL18 and AL28 supply level indications n1 and n2 relating to their respective input signals.

In practice, an amplifier such as AL18 comprises a plurality of stages, and the level is measured by means of detector diodes arranged between two of these stages. A potential use of the level indication is to give a presence signal suitable for triggering the sampling of the phase measurement, the latter being given only by way of example.

Figure 3:
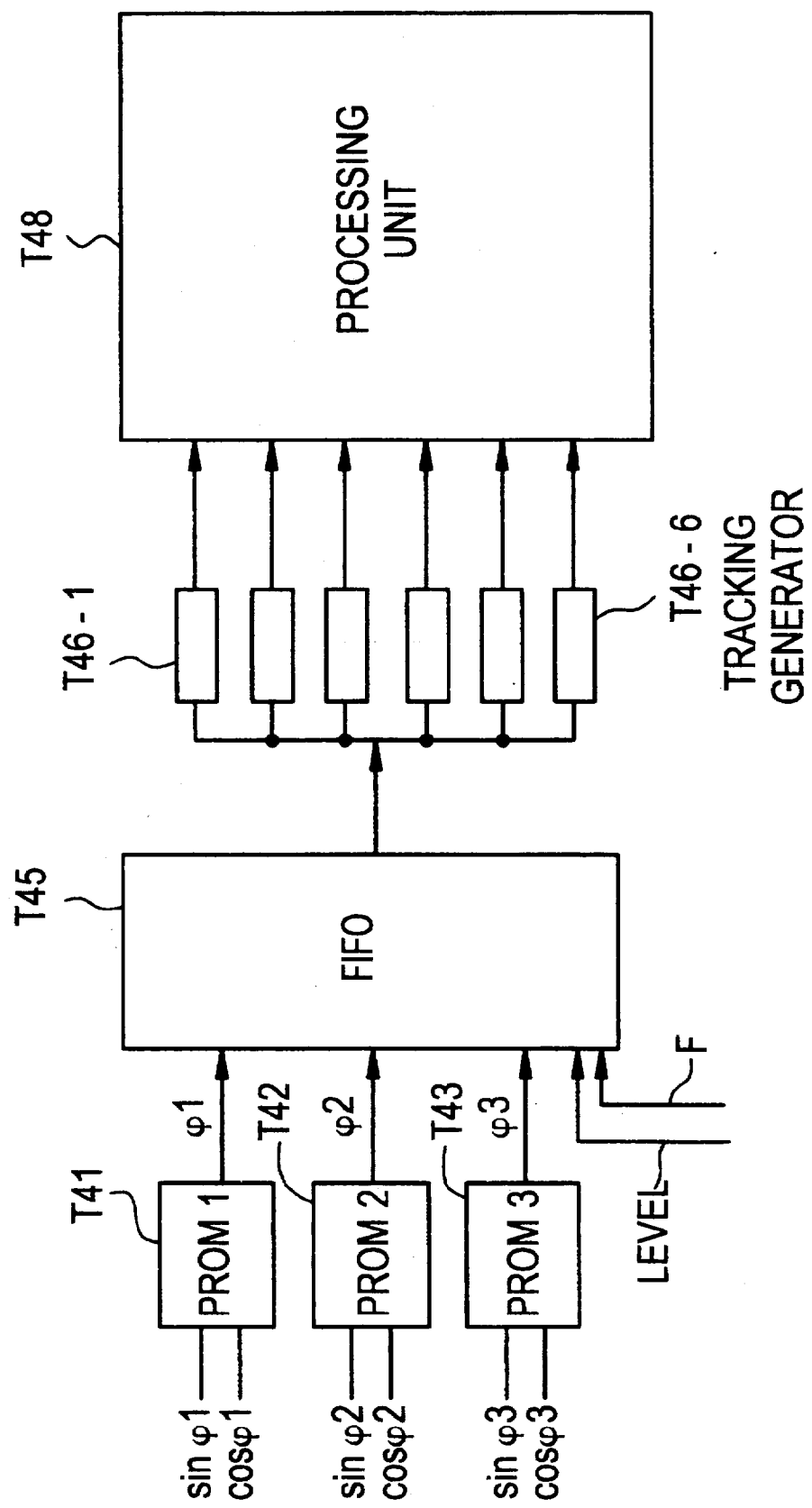
FIG. 3 is a diagram which is also more detailed with respect to a digital part of the interferometric receiver according to the invention.

The level data and phase data are applied to an analog-to-digital converter CN35. In FIG. 3, it has been assumed that it directly supplies the digital phase data and the digital level data.

In fact, if the phase comparator supplies analog data in sine and cosine, the latter can then be digitized in a rough state and then converted to phase by means of a suitable read-only storage, such as that shown at the beginning of FIG. 3 by T41, T42 and T43. It can be seen that three measurement channels are found here, which corresponds to the preferred embodiment form which has not been shown thus far.

A phase comparator supplying two data in sine and cosine can consist in a power divider, two mixers and a 0/90° phase shifter.

FIG. 3 again shows a type of digital processing which is possible for the interferometric receiver according to the invention.

The digital phase data Ø1 to Ø3 are applied to resonant circuits T45 which form a digital storage FIFO, that is, a first in-first out storage.

Data on the frequency of the received signals, determined by an additional receiver which can be of the classic type, is likewise applied in digital form to a storage FIFO corresponding in each instance to phase data connected with it.

The digitized level data are added to this, as already indicated; it is noted that the latter may only be used by a decision unit which is responsible for taking into account the priorities among the received signals.

An additional receiver supplying the frequency will likewise generally give the data relating to the pulse width of the radar in question, the time of arrival of the pulses, and the shape factor, etc. In such a case, these data are likewise introduced in the storage P45, corresponding in each instance to the related frequency and phase data.

All of these different data are then applied to a tracking generator consisting of a plurality of blocks T46-1 to T46-6 (for example). This tracking generator thus consists of a set of digital filters which particularly permit a sorting of threats by means of their directions of arrival, the phase and frequency being known in each case. Based on this, the processing unit T48 of the countermeasure system can calculate the appropriate responses or reactions, namely:

visualization of the data, refinement of the measurement, jamming sequence, tracking effectiveness of the jamming, decoying.

Figure 4:
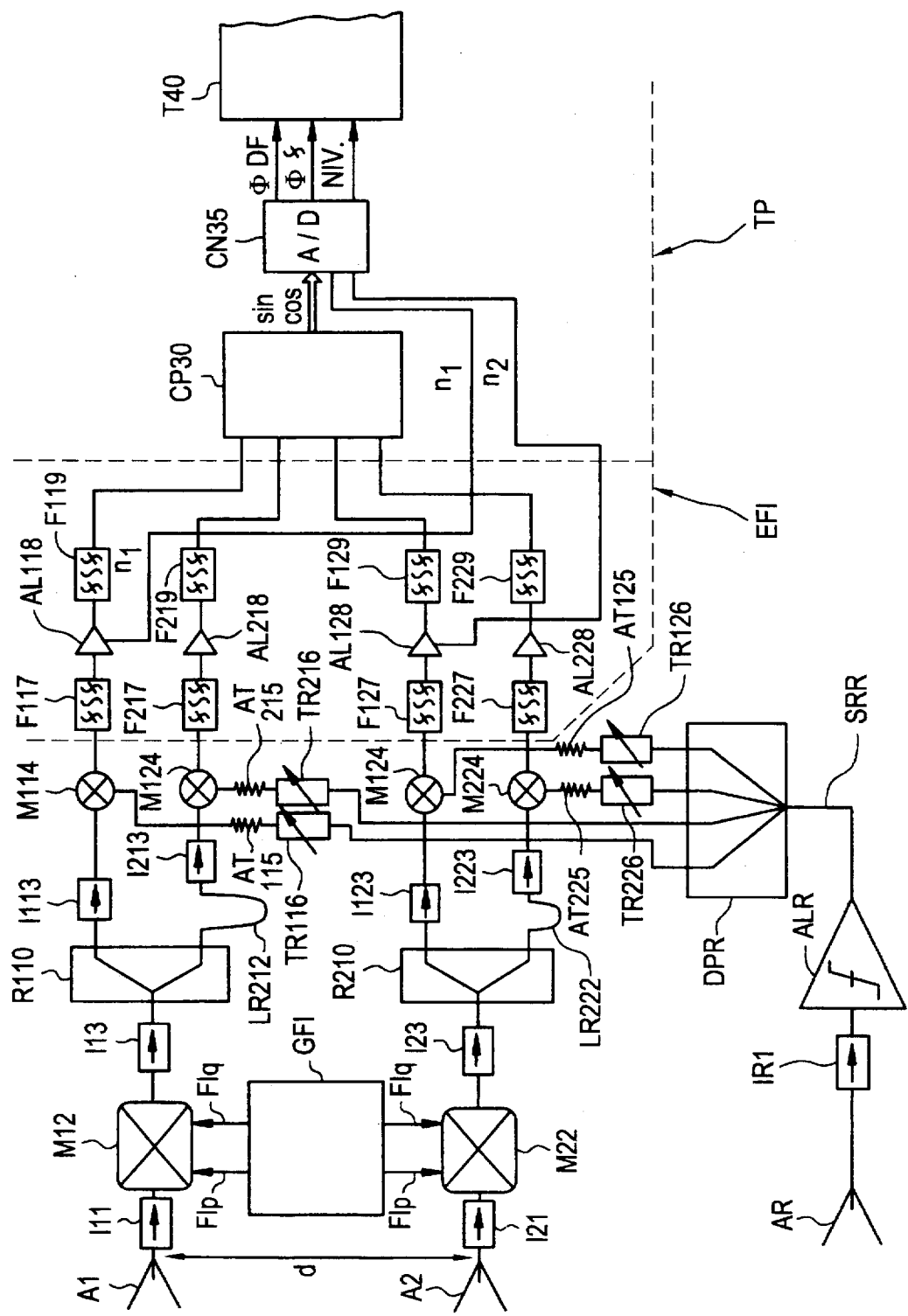
FIG. 4 is a partially detailed wiring diagram of the first variant of the present invention.

In FIG. 4, which shows the first variant of the invention, the signal of antenna AR is applied to a limiting amplifier ALR across an ultrahigh-frequency insulator IR1, followed by a distributing power divider DPR which has four outputs which respectively feed the phase adjusting members TR116, TR216, TR126, TR226, followed, respectively, by attenuators AT115, AT215, AT125, AT225, for supplying the local signal SRR to the mixers M114, M214, M124 and M224.

As before, the antenna A1 is followed by an ultrahigh-frequency insulator I11, then by a single sideband mixer M12 receiving the two components FIp and FIq of a local signal generator GFI in quadrature. The mixer M12 is followed by an ultrahigh-frequency insulator I13. The same structure is found on the other channel which comprises the devices A2, I21, M22 and I23. In practice, a third channel analogous to the first two is provided.

In the embodiment form of FIG. 4, the insulator I13 is followed by an ultrahigh-frequency distributor R110, whose first output supplies an insulator I113 and a mixer M114, as before.

In contrast, the second channel first supplies a delay line LR212, followed by another ultrahigh-frequency insulator I213, then by a third mixer M214, which, as already mentioned, also receives the local signal SRR in the same way as the second mixer M114.

The outputs of the second mixers M114 and M214 are then applied to a doubled intermediate-frequency channel. The filter F117, the amplifier AL118 and the filter F119 are similar to the devices F17, AL18 and F19 of the prior application, it being noted in passing that the amplifier AL118 supplies a level indication n1.

Aside from this possibility of delivering a level indication, the output of the mixer M214 is processed in the same manner by a filter F217, followed by an amplifier AL218 and a filter F219.

In the second channel, after the ultrahigh-frequency insulator I23, there is a distributor R210, one of whose outputs supplies the insulator I123, followed by a mixer M124, then by an intermediate frequency semi-channel F127, AL128 and F129, as before.

In the other output of the distributor R210, one first finds a delay line L222, followed by the insulator 223 and another third mixer M224. The output of the latter is applied to a filter F227, followed by an amplifier AL228 and a filter F229, as is the case for the devices of the first channel F217, AL218 and F219.

The outputs of all the intermediate frequency channels are applied to the phase comparator CP30, whose output is digitized, for example, in sine/cosine, in an analog-to-digital converter CN35, which also receives the level data n1 and n2, for applying the entirety to the device T40 responsible for interferometric processing and sorting.

Whereas this device T40 also receives frequency data of outside origin in FIGS. 1 and 2, in this instance it will receive the frequency data subsequent to the comparator CP30, as will now be seen.

In fact, the processing of the phase data relating to the direction of the incident signal is effected as before by means of comparing the outputs of filters F119 and F129.

On the other hand, other data on the outputs of the filters F219 and F229 is also available.

It is assumed now that the delay line LR212 is long, measuring, for example, an electrical length of 30 cm (in terms of wavelength), while the delay line LR222 is shorter, measuring, for example, an electrical length of 4.5 cm.

If F designates the incident signal frequency and f designates that of the intermediate-frequency generator GFI, the signals applied to the two delay lines have a frequency of F−f (or F+f).

Their total phase expressed in number of rotations, is then modified by (F−f).t, where t designates the delay in each delay line.

For the shortest delay line, LR222 in this instance, t is chosen in such a way that the phase modification remains less than one revolution, at least when the frequency of the incident signal sweeps the useful frequency band in question. The other delay line LR212 can then be selected so as to be longer, so that its delay provides a measurement which is ambiguous but more precise.

By effecting a phase comparison between the outputs of filters F119 and F219 on the one hand, and between the outputs of filters F129 and F229 on the other hand, two phase measurements are obtained which can be related to the frequency of the incident signal, one of them being unambiguous, while the other is more precise but ambiguous. The rest of the processing is considered to be within the ability of one skilled in the art.

In this embodiment form, it is assumed that the third channel (not described) retains the structure discussed with respect to FIGS. 1 and 2.

A variant of the present invention would consist in outfitting the three channels in the same way as is described here for two channels, with respect to FIG. 4. Of course, the electrical lengths of the three delay lines are different in principle, unless a redundancy in measurement is desired.

One can now envisage the determination of the frequency of the incident signal without ambiguity based on the two ambiguous measurements, but in a different manner. It was preferred in this instance to effect an unambiguous measurement and a sensitive measurement.

On the other hand, when three different phase measurements relating to the frequency are available it will often be simpler to effect three sensitive measurements having different ambiguities, whose comparison allows the determination of the frequency in an unambiguous manner.

The second variant of the invention will now be described.

Figure 5:
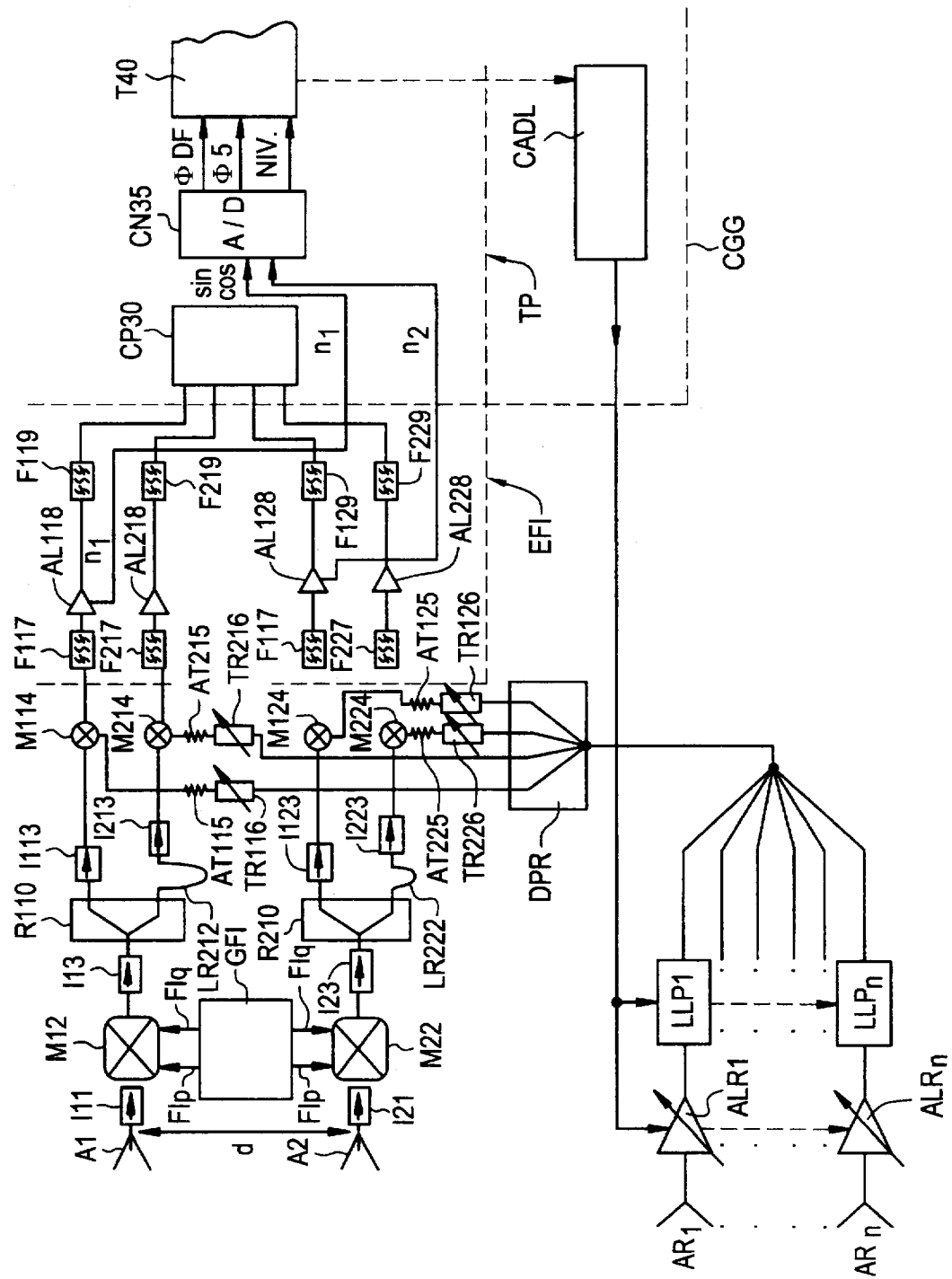
FIG. 5 is a schematic illustration of the second variant of the invention.

In FIG. 5 (in contrast to FIG. 4), the antenna of the reference channel consists of a series of elements AR1 to ARn which, together, form an antenna system. The radiation pattern of a single element of this antenna system is selected so as to have an angular coverage sufficiently important for ensuring the detection of all azimuths; that is, its angular coverage is the same as that of each of the interferometric antennae A1 and A2. The sameness of the angular coverage concerns not only the angular aperture of the antennae, but also their orientation in space.

Each element of the antenna, such as AR1, is followed by a variable-gain amplifier ALR, preferably a limiting amplifier, then by an element suitable for acting on the phase, which element can be either a line with programmable length, such as LLP1, as shown in FIG. 5, or a phase shifters The outputs of these different circuits which are thus placed in series with the individual elements AR1 to ARn of the antenna system are then combined so as to be applied to the input of the circuit DPR of FIG. 5.

Moreover, a device for controlling the amplification, as well as the phase shifting or delay, is provided which is designated by CADL in FIG. 5 and constitutes part of a generalized gain controlling means CGG.

The processing circuits T40 supply indications on the presence of certain threats after interferometric processing. These data are used for the generalized gain control.

Moreover, the aircraft on which the interferometric receiver is arranged on board knows the position of the friendly aircraft or other friendly objects whose signals there is no cause to process. These data are likewise transmitted to the generalized gain control circuit.

With respect to material, the digital processing for the generalized gain control, which is achieved in the circuit CGG, can be effected by means of a separate calculator or by means of the same calculator as the interferometric processing.

The interferometric receiver must ensure the warning operation which consists in the detection and identification of hostile signals. During this operation, the radiation pattern representing the electronically sweeping antenna of the reference channel should have minimum values of radiation, designated "holes", at the frequencies and in the direction of the friendly signals. These holes should be created simultaneously.

The antenna system then presents a radiation pattern of the large pattern type which ensures the maximum angular coverage but with "holes" which have a certain pass-band for taking into account a possible agility of the signals to be attenuated, and these holes should thus be located at well-defined frequencies and in well-defined directions.

Another function of the interferometric receiver is to ensure the tracking of threats after the latter are detected in a dense electromagnetic environment. The spatial selectivity also proves necessary in this instance in order to eliminate the influence of undesirable signals. Thus, it permits the tracking of the agility parameters of the signals relating to the threat with a great effectiveness while limiting the proportion of false alarms.

The antenna system must thus present a radiation pattern of the directional type having maximum values of radiation, designated "bosses". In this case, also, these bosses should have a certain pass-band for taking into account a possible frequency agility. Ana these bosses should be located in the directions defined by the characteristics of the tracked threats.

In the embodiment form which is shown, the control lines which are placed in series with the elements of the antenna system consist of lines having a programmable length. The latter have the advantage that they offer a delay which is independent of the frequency. The phase displacement created by such a line is proportional to the delay BT associated with the line and inversely proportional to the wavelength LO corresponding to the frequency to be processed.

In the event of an alarm situation holes must be created. The creation of such a radiation hole is effected in that the value of the complex field is determined for an element of the antenna system in the direct in which one desires to create the hole and at the frequency at which one wants to create the hole. By means of the other elements of the antenna system, an opposite field is created in such a way that the resulting contribution is zero in the direction of the hole and for the frequency in question.

The processing can be done in the same manner if the lines having programmable length are replaced with phase shifters.

The case of tracking threats will now be examined.

The principle of forming a maximum value of radiation in a given spatial direction consists in applying to the system a law of phase obeying an arithmetic progression in which the difference between the consecutive terms, expressed in phase rotation, is inversely proportional to the wavelength, proportional to the spacing of the elements of the antenna system, as well as to the sine of the angle formed between the axis of the antenna and the direction in which the radiation maximum is desired.

This can be carried out with phase shifters or with lines having programmable length, as desired.

On the other hand, the problem becomes more complicated when one wants to track a plurality of threats at the same time.

In the case of phase shifters, the principle of controlling the system is obtained by means of adding up the complex principles applied to the system in order to separately ensure the tracking of each threat.

On the other hand, if the lines having a programmable length are used the problem is much more delicate, taking into account the nondispersive character of the lines.

Nevertheless, for a determined frequency the spatial delay brought about by a delay line of a known length is defined by a whole number close to the wavelengths relative to this frequency.

Thus, it is possible to operate the present invention with lines having a programmable length by providing the latter, respectively, with lengths which, when increased by whole numbers of wavelengths relative to the different frequencies which must be considered, result in a length which is identical for each threat which is processed.

Based on the information above, one skilled in the art knows how to develop a gain control for the different channels of the antenna system in order to operate the present invention.

However, for whatever purpose, reference is made to the French Patent Application No. 83 16 653, which contains a complete discussion of the matrix relations which allow a generalized gain control to be put into operation. In this respect, the descriptive contents of the prior patent application are incorporated in the present patent application to the extent that this is necessary.

One skilled in the art will understand that other types of countermeasures are conceivable. It is not considered necessary to explain in more detail here the nature of these countermeasures, nor the manner in which they are put into operation. In fact, the present invention is principally on the level of those means permitting the determination of basic information required for putting countermeasures into operation.

Of course, the present invention is not limited to the embodiment form described above and extends to all variants included within the scope of the following claims.

We claim:

1. In a receiver for electromagnetic signals having:
   at least two radio-frequency reception channels, each comprising an antenna (A1, A2) for an incident signal and each having an output,
   mixing means having separate channels for separately mixing (M12, M14, M22, M24) the output signals of said two radio-frequency reception channels with one or more local signals, said mixing means having respective outputs,
   two intermediate frequency amplification channels (FI1, FI2) connected to the respective outputs of said mixing means for amplifying intermediate frequencies to form signals, and
   processing means for processing (TP) the signals derived from said two intermediate frequency amplification channels, the improvement wherein each channel of said mixing means comprises:
      a first single sideband mixer (M12, M22), which receives a local signal (FIp, FIq) having a fixed frequency equal to the value of one of the intermediate frequencies, and
      a second mixer (M14, M24) receiving as local signal a received reference signal (SRR) similar to that of said two reception channels.

2. Receiver according to claim 1, characterized in that ultrahigh-frequency insulators (I13, I23) are provided between said first and second mixers.

3. Receiver according to claim 1, characterized in that an ultrahigh-frequency insulator (I11, I21) is provided between each antenna and said first mixer assigned there to.

4. Receiver according to claim 1, characterized in that said received reference signal (SRR) is taken from an auxiliary reception channel comprising an auxiliary antenna (AR) and limiting amplifiers (ALR).

5. Receiver according to claim 4, characterized in that said auxiliary (AR) of said auxiliary reception channel is more directional than said antennae (A1, A2) of the radio-frequency reception channels.

6. Receiver according to one of claim 4, characterized in that said reference reception channel comprises means for frequency filtering.

7. Receiver according to claim 1, characterized in that each said intermediate-frequency amplification channel comprises two bandpass filters (F17, F19; F27, F29) with an intermediate frequency amplifier (AL18, AL28) therebetween together forming a level indicator suitable for providing a level indication (n1, n2), the outputs of said intermediate-frequency amplification channels being connected to a phase comparator (CP30) which operates by means of coherent demodulation.

8. Receiver according to claim 7, characterized in that sine and cosine data derived from said coherent of said phase comparator demodulation (CP30) and said level indications (n1, n2) are digitized by means of an analog-to-digital converter (CN35).

9. Receiver according to claim 8, characterized in that said processing means comprises in addition, read-only storages (T41–T43) for deriving phase data from said sine and cosine data.

10. Receiver according to claim 9, characterized in that said processing means comprise, in addition, a first in-first out storage (T45) connected to a tracking generator (T46) and a processing unit (T48).

11. Receiver according to claim 1, characterized in that at least one of the two mixing means channels comprises a delay device (LR212) in parallel with said second mixer (M114), followed by a third mixer (M214) which also receives said received reference signal (SRR) as local signal, and means for conducting a phase comparison between outputs of said second and said third mixers for providing data on the frequency of the incident signal.

12. Receiver according to claim 11, characterized in that at least the other of the two mixing means channels also comprises another delay device (LR222) in parallel with its second mixer (M124), followed by another third mixer (M224), the respective delays of said two delay devices (LR212, LR222) being different.

13. Receiver according to claim 12, characterized in that one of the delays is selected so as to provide an unambiguous measurement of frequency at the useful frequency band of the incident signals, whereas the other permits a more sensitive frequency measurement.

14. Receiver according to claim 12, characterized in that the different delays are selected in order to define a plurality of sensitive and ambiguous frequency measurements, the comparison of which allows the ambiguity to be removed.

15. Receiver according to one of claim 11, characterized in that said two intermediate-frequency amplification channels (FI1, FI2) feed comparison signals relating to the frequency to the same processing means (CP30, CN35, T40) which includes means for interferometry.

16. Receiver according to claim 12, characterized in that an ultrahigh-frequency insulator (I213, I223) is provided between each delay device (LR212, LR222) and said third mixer (M214, M224) follows said insulator.

17. Receiver for electromagnetic signals according to claim 1, including means for generating said received reference signal (SRR) arranged so as to effect a spatial filtering suitable for modifying the weight of the received signals in selected spatial directions.

18. Receiver according to claim 17, characterized in that the means for generating the reference signal comprise an antennae system, each of whose elements has the same angular coverage as said antennae (A1, A2) of said two radio-frequency reception channels, and generalized gain control means for providing said received reference signal (SRR) by means of the combination, weighted with respect to amplitude and phase, of the signals individually provided by the elements of said antenna system.

19. Receiver according to claim 18, characterized in that said generalized gain control means comprise transfer units with variation of amplitude, phase and time in series with each element of said antenna system, as well as means for controlling these units in order to obtain the desired modifications relative to certain directions of the radiation pattern of said antenna system.

20. Receiver according to claim 19, characterized in that said units comprise one of amplifiers and attenuators in series with phase shifters.

21. Receiver according to claim 19, characterized in that said units comprise one of amplifiers and attenuators in series with lines having programmable lengths.

22. Receiver according to one of claim 17, characterized in that modifications of radiation pattern comprise the creation of "holes" which particularly allow one to avoid processing friendly signals.

23. Receiver according to one of claim 17, characterized in that modifications of radiation pattern comprise the creation of "bosses" which particularly allow the tracking of threats.

* * * * *